United States Patent [19]
Dowling

[11] 3,758,847
[45] Sept. 11, 1973

[54] METHOD AND SYSTEM WITH VOLTAGE CANCELLATION FOR MEASURING THE MAGNETIC SUSCEPTIBILITY OF A SUBSURFACE EARTH FORMATION

[75] Inventor: Donald J. Dowling, Houston, Tex.

[73] Assignee: Texaco Inc., New York, N.Y.

[22] Filed: Dec. 23, 1971

[21] Appl. No.: 211,403

[52] U.S. Cl. .................................................. 324/6
[51] Int. Cl. .......................... G01v 3/10, G01v 3/18
[58] Field of Search ................................ 324/1, 3–7

[56] References Cited
UNITED STATES PATENTS

| | | | |
|---|---|---|---|
| 3,614,600 | 10/1971 | Ronka | 324/6 X |
| 3,555,409 | 1/1971 | Atwood et al. | 324/6 |
| 3,065,407 | 11/1962 | Huddleston et al. | 324/6 |
| 3,105,190 | 9/1963 | Norris | 324/6 |
| 3,112,443 | 11/1963 | Buckner | 324/6 |
| 3,119,061 | 1/1964 | Tanguy | 324/6 |
| 3,496,455 | 2/1970 | Gouilloud | 324/6 |
| 3,609,522 | 9/1971 | Hutchins | 324/6 |

Primary Examiner—Gerard R. Strecker
Attorney—Thomas H. Whaley et al.

[57] ABSTRACT

A magnetic susceptibility well logging system is provided with an improved null circuit for more precisely cancelling the exciter voltage component out of the receiver coil voltage sought to be measured. A monitor circuit and method is provided for detecting any phase shifts occurring in the null voltage during the logging operation, and a capacitance is varied in response to such monitoring to continually realign the phase of the null voltage. In particular, a DC voltage is generated as a function of the detected phase difference, and is applied to a semiconductor diode interconnected with the null circuit. Accordingly, the capacitance provided by the diode is varied as a function of the DC voltage, whereby the phase of the null voltage is regulated as a function of the capacitance characteristic introduced into the null circuit by the diode.

25 Claims, 6 Drawing Figures

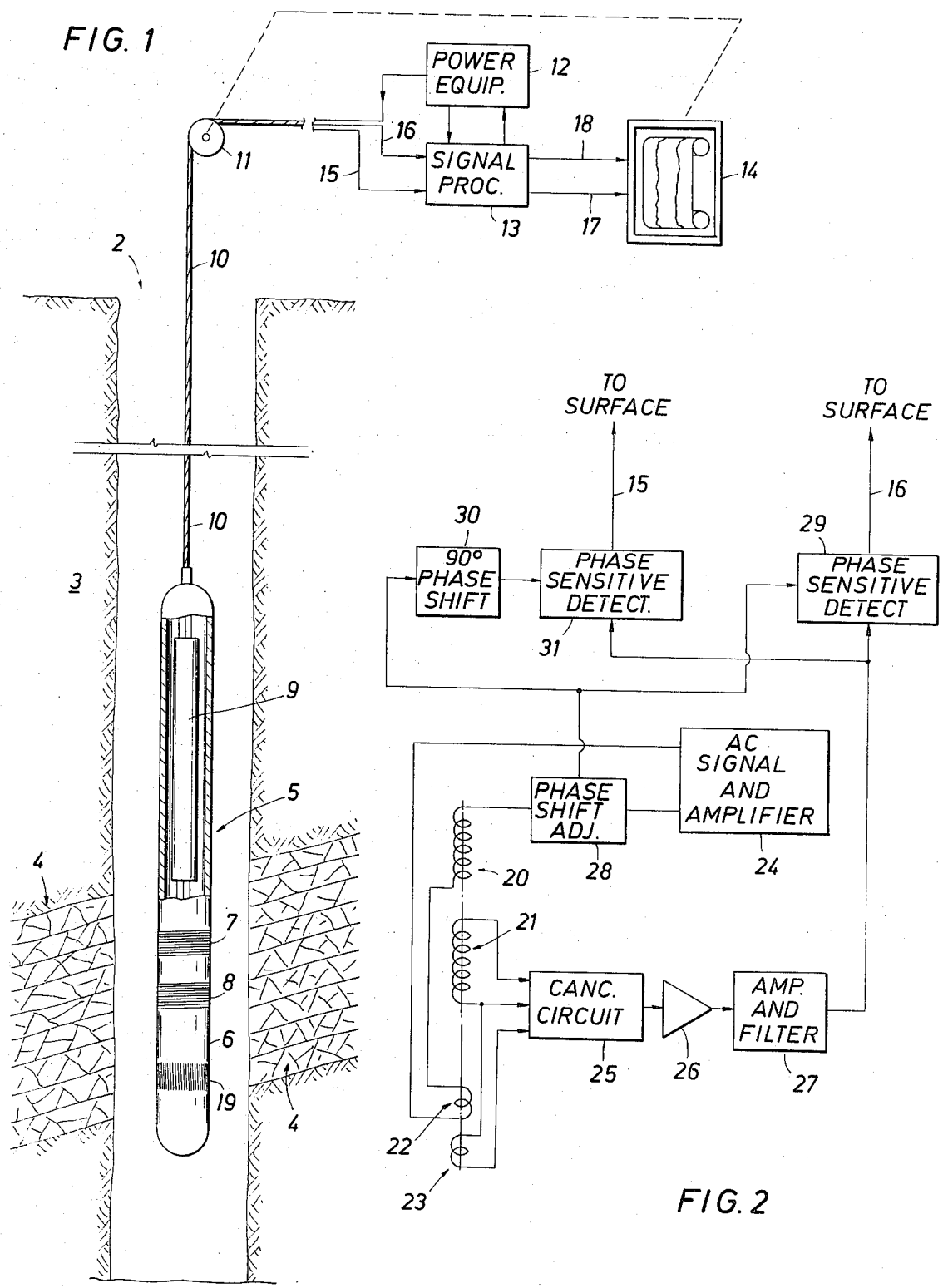

METHOD AND SYSTEM WITH VOLTAGE CANCELLATION FOR MEASURING THE MAGNETIC SUSCEPTIBILITY OF A SUBSURFACE EARTH FORMATION

BACKGROUND OF THE INVENTION

This invention relates to methods and apparatus for performing geological investigations and, more particularly, relates to improved well logging methods and apparatus for determining selected lithological characteristics of subsurface earth formations.

It is well known that oil and gas is found in certain types of subsurface earth formations and that boreholes are drilled into the earth for the purpose of tapping these formations and recovering these fluids. It is now also well known that it is frequently difficult to identify a fluid-bearing formation of interest and that well logging techniques and equipment are employed to survey the various formations traversed by the borehole.

There are many different lithological parameters which are a function of the fluid-bearing properties of a subsurface earth formation and which may be measured to provide a reasonable indication of the likelihood that oil and gas may be present. For example, it is well known to employ well logging techniques to measure the resistivity of the earth substances traversed by a borehole.

Another well logging operation which is now widely used by the petroleum industry, involves the technique of inducing a current flow in the earth materials adjacent the borehole, and then measuring this current flow to determine the conductivity of the earth. More particularly, an exciter or transmitter coil is disposed in the borehole adjacent a formation of interest and is then excited with an AC signal of suitable frequency to create an electromagnetic field in the formation. Accordingly, a second search or receiver coil is also disposed in the borehole within the field, whereby an AC signal is induced in the receiver coil by the electromagnetic field which has been induced in the formation. The AC signal being applied to the transmitter coil is of a fixed preselected magnitude, and thus the signal which is induced in the receiver coil will depend on the lithological characteristics of the adjacent formation.

It is well known that the magnitude of the current flow induced in the receiver coil is dependent on the magnitude of current flow being induced in the formation. Accordingly, it is conventional to measure the voltage across the receiver coil which is in phase with the transmitter coil current to obtain an indication of either the conductivity or the resistivity of an earth formation.

It is also well known that the component of the receiver coil voltage which is in phase quadrature with the transmitter coil current is, at selected frequencies, largely a function of the magnetic susceptibility of the formation. Dirrerent types of earth formations may have substantially the same conductivity and permittivity, but different magnetic permeability, and thus it has long been sought to provide methods and apparatus for making both a magnetic susceptibility measurement as well as a conductivity measurement of the earth substances traversed by a borehole.

There are various problems involved with magnetic susceptibility logging which are not encountered when a conventional conductivity measurement is sought to be made. In the first place, the voltage variations which are attributable to the magnetic susceptibility of the formation materials are often quite small in comparison to the component of the receiver coil voltage which is a direct contribution of the transmitter coil voltage through their mutual inductance. For example, it is often found that if the standard component of the receiver coil voltage is on the order of 30,000 microvolts, the fluctuations of the receiver coil voltage which are attributable to magnetic susceptibility of the formation may be as little as 1-2 microvolts.

Another problem which has heretofore limited the usefulness of a magnetic susceptibility measurement arises from phase lag which is due to factors such as the conductivity of the formation, and impedance variations occurring in the logging system electronics. It will be apparent that any amplitude measurement is phase-dependent, and, if there is any significant phase shift at all, this will seriously affect the magnitude of the voltage sought to be measured.

One important source of phase shift may be found in the various impedances which are present throughout the sonde and which are due to factors such as the resistances of the coils themselves, and such as the capacitances which develop between the windings of the coils. It is well known that a change in phase angle can be achieved by coupling a capacitor into the circuit, and thus it was sought to overcome this problem in the prior art systems by the addition of a variable capacitor for calibrating or zeroing out the voltage induced by mutual inductance between the coils of the sonde before inserting it into the borehole. Unfortunately, however, these system impedances are frequently altered during the logging operation by factors such as borehole temperature, instrument drift, and the like, and these variations are usually large enough to seriously affect the accuracy and reliability of any measurement of magnetic susceptibility if such a static calibration is relied on alone.

Another important source of phase shift error arises as a result of the conductivity of the formation sought to be logged. The formation conductivity is a function of the current flow induced in the formation by excitation of the transmitter coil. The receiver coil voltage is exactly 90° out of phase with the current flowing in the formation, however, and thus the current flow in the formation is at a minimum, or zero, when the receiver coil voltage reaches peak amplitude. Accordingly, it has heretofore been assumed that due to this phenomenon, any measurement of the magnetic susceptibility of a formation will necessarily exclude a measurement of the formation conductivity.

The resistivity of the formation will also produce a phase lag in the current flow in the formation, however, which will necessarily be reflected in the phase of the voltage induced by formation currents in the receiver coil. Since the resistivity of the formation is merely the reciprocal of its conductivity, it will be apparent that, notwithstanding previous assumptions, formation conductivity can have a significant effect on magentic susceptibility measurements sought to be made with the techniques of the prior art.

These and other disadvantages of the prior art are overcome with the present invention, however, and novel methods and apparatus are provided herewith for making a more accurate magnetic susceptibility logging measurement which is consistently reliable.

Summary of Invention

In a preferred embodiment of the present invention, a magnetic susceptibility logging system is provided which includes a measuring instrument or sonde which is sized to be passed through a borehole, suitable surface equipment for processing and recording information signals produced by the sonde, and a logging cable for suspending the sonde in the borehole and for transmitting power and information signals between the sonde and the circuitry at the surface. The sonde is preferably adapted to contain various circuitry as will hereinafter be explained in detail, and is further provided with an assembly of transmitter and receiver coils for creating and measuring a localized electromagnetic field in the earth substances adjacent the borehole. More particularly, the sonde is provided with at least one transmitter coil axially arranged in the borehole so that, when excited by an AC signal of a suitable frequency, it induces the desired electromagnetic field in the surrounding earth formations. The sonde is also provided with at least one receiver coil also axially positioned in the borehole and which develops an induction voltage as a result of such field. The electromagnetic field induced in the formation is a function of the magnetic susceptibility of the formation, and thus the magnitude of the voltage induced in the receiver coil is a functional indication of the magnetic susceptibility of the formation substances.

As hereinbefore explained, however, the magnitude of the fluctuations in receiver coil voltage, which are attributable to the magnetic susceptibility of the formations, are often relatively quite small. Accordingly, a pair of null coils are preferably included for the purpose of developing an offsetting voltage which may be used to cancel the large voltage component out of the receiver coil voltage which is attributable to the exciter voltage being applied to the transmitter coil. The voltage which remains may be attributed more directly to the magnetic susceptibility of the formation. This remainder voltage is usually a very small component of the total voltage being induced in the receiver coil. The remainder voltage fluctuates widely, however, in response to variations in the lithology of the earth materials adjacent the borehole, and this remainder voltage can be amplified by conventional techniques to better adapt the signal to recording and examination.

It will be apparent that the accuracy of the remainder voltage will depend upon the degree of precision with which cancellation of the exciter voltage component of the receiver coil voltage is effected. Accordingly, it will be apparent that it is necessary for the null voltage to be exactly in phase with the voltage from the receiver coil in order for precise cancellation to be achieved.

Unfortunately, the various coil circuits are susceptible to environmental changes such as fluctuations in the temperature in the borehole, and these changes will produce fluctuating electrical effects in the circuitry which can introduce changes in phase angle. The null coil circuits are especially subject to this condition, for the reason that the windings of the null coils tend to be spaced very closely together, and a small change in borehole temperature can introduce a relatively large phase angle factor into the circuitry. Thus, the accuracy of the measurement sought to be made is often adversely affected by factors which are unknown to the system operator.

Accordingly, a phase detector and other control circuitry is preferably provided for developing a DC voltage which is functionally related to any phase angle change which may occur between the signal which comprises the residual voltage across the receiver coil and the voltage across the receiver null coil. In addition, a capacitive diode is preferably interconnected with the null coil circuit and the phase detector, whereby its capacitance characteristic can be varied as a function of the aforesaid DC voltage, and whereby the null voltage will be shifted in phase as a function of the capacitance characteristic of the diode.

The capacitance of the diode can be established as a function of any voltage which may be applied to it. Thus, if the DC voltage from the control circuitry is continually generated as a function of a continuous monitoring of the relative phase angle of the null voltage, it will be apparent that the phase angle of the magnetic susceptibility signal can be continually monitored and corrected.

As hereinbefore stated, the resistivity of the formation will also produce a phase lag in the current induced in it, and this phase lag will be propagated in the voltage induced across the receiver coil. The conducitivity of the formation is a function of the frequency of the current flow which is induced in the formation by the electromagnetic field; the higher the frequency, the higher the conductivity. Thus, it is conventional practice in induction logging to enhance the conductivity measurement by employing an excitation voltage having a frequency of the order of 20 $KH_z$.

The strength of the magnetic susceptibility signal induced in a receiver coil by a formation is also a function of the frenquency of the current flow induced in the formation by the electromagnetic field. The magnetic susceptibility signal generated by a formation increases relatively slowly as the field frequency is increased, however, as compared with the rate 21. increase of the conductivity signal generated by the formation. Accordingly, reducing the field frequency will decrease the magnitude of the conductivity signal induced by the formation current flow much faster than it tends to decrease its magnetic susceptibility signal. Thus, it is usually preferably to actuate the transmitter coil with a frequency which is much lower than that normally used for induction logging purposes.

For example, it is conventional to employ a 20 $KH_z$ frequency to drive the transmitter coil of an induction logging system. In contrast, it has been found quite practical and in fact desirable for magnetic susceptibility logging purposes to employ a frequency as low as 1 $KH_z$.

As will hereinafter be explained in detail, one especially useful embodiment of the present invention involves means and methods for deriving correlative and simultaneous measurements of both the conductivity and the magnetic susceptibility of a formation, and in such an embodiment it will be preferable, of course, to employ a more conventional actuating frequency to drive the transmitter coil. The voltage signal at the receiver coil which is detected by the aforementioned phase sensitive detector should, however, be a function of all phase lags which have occurred, regardless of cause. Accordingly, the correction voltage which is applied to the capacitance diode should provide full compensation for any phase change resulting from formation conductivity as well as instrumentation drift, regardless of whether a low or a high frequency is employed to drive the transmitter coil.

Accordingly, it is a feature of the present invention to provide a more accurate and reliable measurement of the magnetic susceptibility of a subsurface earth formation.

It is another feature of the present invention to provide magnetic susceptibility well logging methods and apparatus which are corrected for phase shift resulting from formation conductivity, instrumentation impedances, and the like.

It is a further feature of the present invention to provide methods and apparatus for monitoring and correcting phase angle errors occurring during the measurement of the magnetic susceptibility of subsurface earth formations traversed by a borehole.

These and other features and advantages of the invention will become more apparent from the following detailed description, wherein reference is made to the figures of the accompanying drawings.

IN THE DRAWINGS

FIG. 1 is a simplified pictorial representation of a well logging system adapted to survey the magnetic susceptibility and the conductivity of subsurface earth materials according to the concept of the present invention.

FIG. 2 is a simplified functional representation of portions of the system depicted in more general terms in FIG. 1.

DETAILED DESCRIPTION

Figure 3:
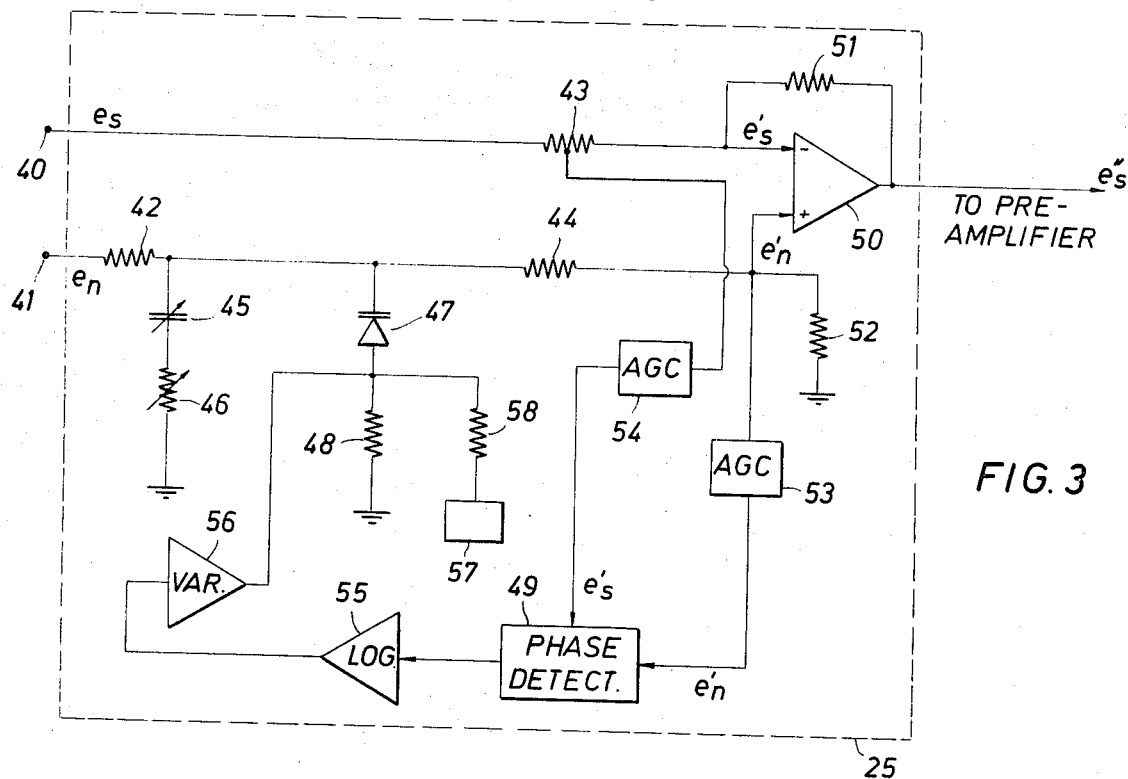
FIG. 3 is a simplified schematic representation of the significant components of an exemplary embodiment of a portion of the apparatus depicted functionally in FIG. 2.

Referring now to FIG. 1, there may be seen a simplified pictorial representation of a well logging system embodying one form of the present invention and adapted to provide a correlative simultaneous measurement of the conductivity and the magnetic susceptibility of the earth materials 3 traversed by a conventional borehole 2. More particularly, the system may be seen to include an elongated logging instrument or sonde 5 which is suspended in the borehole 2, adjacent a formation 4 of interest, by means of a multiconductor well logging cable 10 of conventional design. The cable 10 may be supported by a conventional sheave wheel 11 and may be connected at the surface to equipment for processing and recording signals produced by the sonde 5.

Referring more particularly to the system, it may be seen that the sonde 5 is composed of a housing 6 which contains a circuitry comprising one or more transmitting coils 7 for generating a localized time varying electromagnetic field in the vicinity of the borehole 2, and one or more receiver coils 8 for detecting and measuring characteristics of the field as affected by the formation 4. More particularly, the electromagnetic field tends to induce a functionally related signal in the portions of the formation 4 adjacent the coils 7 and 8, and this, in turn, induces a functionally related signal in the receiver coil 8 which is functionally representative of the formation parameters sought to be measured. In addition, as assembly of null coils 19 is also preferably mounted in some suitable location on the housing 6 so as to be rendered independent of the effect of either the formation 4 or the electromagnetic field which is produced by the transmitter coil 7.

Referring again to the sonde 5, it may be seen that suitable electronics 9 may also be located in the housing 6 for actuating the transmitter and null coils 7 and 19 and for correcting and handling the measurement signals provided by the receiver coils 8. Thus, the electronics 9 may include means as hereinafter described for correcting these measurement signals for phase shift occurring as a result of factors such as temperature effects on portions of the electronics 9, impedance factors inherent in the construction of the coils 7, 8 and 19, and the conductivity of the formation 4 being investigated. Alternatively, if desired, these corrections may be made by circuitry located at the surface, of course.

In an ideal embodiment of the present invention, the electronics 9 will include means for deriving a signal which is functionally representative of the conductivity of the formation 4 being investigated, and a correlative but separate signal which is functionall representative of the magnetic susceptibility of the formatio 4.

Referring again to FIG. 1, it may be seen that the surface equipment may include a master power supply 12 for energizing the system, suitable processing circuitry 13 for amplifying and processing the conductivity signal 15 and the magnetic susceptibility signal 16 received from the cable 10, and a suitable recorder 14 for correlatively displaying the processed conductivity and magnetic functionally signals 17 and 18 received from the formation circuitry 13, as well as any other measurement signal which may be obtained from the sonde 5. The surface power supply 12 can transmit power to the electronics 9 in the sonde 5 in a conventional manner.

The sheave wheel 11 is intended to support the logging cable 10 and sonde 5 in the borehole 2 as hereinbefore mentioned, and thus the sheave wheel 11 may be suspended over the month of the borehole 2 by any suitable means such as a derrick (not depicted) or other such means. The sheave wheel 11 may also perform the additional function of measuring the length of the cable 10 being paid into the borehole 2, and thus the recorder 14 is preferably mechanically or electrically interconnected to be driven by the rotating sheave wheel 11 to provide a correlative indication of the depth of the sonde 5 in the borehole 2.

Referring now to FIG. 2, there may be seen a simplified schematic representation of portions of the apparatus depicted in FIG. 1. In particular, the apparatus may include a suitable AC signal source and amplifier assembly 24 of conventional design for providing an appropriate exciter voltage to a transmitter coil 20 and an oppositely wound transmitter null coil 22. The exciter voltage signal from the AC signal source 24 may also be seen to be applied through a suitable phase shift adjustment circuit 28 to a phase sensitive detector 29, and through a 90° phase shift circuit 30 to one of the inputs of a second phase sensitive detector 31.

It is the purpose of the transmitter coil 20 to generate the localized electromagnetic field which, as hereinbefore explained, induces a corresponding electromagnetic field in the formation 4 depicted in FIG. 1. Accordingly, a receiver coil 21 is also preferably included for developing a voltage signal which is a function of the magnetic field induced in the near-by formation 4, and which is functionally related to the magnetic susceptibility of the formation 4.

The greater portion of the voltage induced in the receiver coil 21 is usually a contribution of the exciter voltage actuating the transmitter coil 20 which is transmitted by mutual inductance, and only a very small portion is usually attributable to the magnetic susceptibility of the formation 4 in question. Thus, the various fluctuations in the receiver voltage will usually be quite small in proportion to the overall voltage induced in the receiver coil 21, even though these fluctuations may be highly significant in any determination of magnetic susceptibility.

It will be apparent that it would be desirable for magnetic susceptibility measurements if the induced voltage in the receiver coil 21 could be entirely attributed to the magnetic susceptibility of the formation 4. Accordingly, in the system depicted in FIGS. 1 and 2, this is accomplished by the provision of a receiver null coil 23, which is positioned to pick up the signal being applied to the transmitter null coil 22 by the AC signal source 24, and which is interconnected with the receiver coil 21. The two null coils 22 and 23 are both arranged to be unaffected by the formation 4 adjacent the sonde 5, as hereinbefore stated, and thus the voltage induced in the receiver null coil 23 by the signal applied to the transmitter null coil 22 will correspond with the unwanted contribution to the receiver voltage which is attributable to the signal from the AC signal source 24. It will be noted, however, that the voltage signal induced in the receiver null coil 23 by the transmitter null coil 22 will be 180° out of phase with the voltage signal in the receiver coil 21. Thus, the signal in the receiver null coil 23 may be used to cancel the component of the voltage in the receiver coil 21 which is attributable to the signal from the AC signal source 24, whereby the only voltage remaining in the receiver coil 21 will be attributable to the magnetic susceptibility of the formation 4 of interest. Accordingly, there is preferably induced a suitable cancelling circuit 25 which, as will hereinafter be explained in detail, will so combine the voltage in the receiver null coil 23 with the voltage induced in the receiver coil 21, by the electromagnetic field, as to produce a remainder voltage which may be attributed more directly to the magnetic susceptibility of adjacent earth materials.

Referring again to FIG. 2, it will be noted that the adjusted magnetic susceptibility signal from the cancelling circuit 25 is preferably applied to a suitable preamplifier 26 and is thereafter further processed in a conventional manner by an amplifier and filter circuit 27 before being applied to the two phase sensitive detectors 29 and 31.

As hereinbefore explained, the electronics 9 and the various coil assemblies 7, 8 and 19 depicted in FIG. 1 will have their own fixed impedance and capacitance characteristics, and this will tend to introduce changes in the phase angle of both the magnetic susceptibility signal and the exciter voltage supplied by the AC signal source 24. The phase monitoring and correction circuit 25 can be made to compensate for these as well as the other phase shifts hereinbefore referred to, but the phase shift caused by the fixed impedances and capacitances of the system are usually relatively large in magnitude, and since they are also relatively fixed, it is preferable to provide means for conveniently calibrating the system to eliminate this source of error. Accordingly, a manually operated phase adjustment circuit 28 is preferably included to eliminate this source of error.

Both of the two phase sensitive detectors 29 and 31 are constructed to derive a DC voltage output signal which is proportinate in magnitude to any voltage difference occurring between two incoming AC signals of equal phase. If the input AC signals are out of phase, the two detectors 29 and 31 will still detect a voltage difference, but any phase difference will inherently produce a voltage difference. Accordingly, it will be apparent that if the true voltage diffPrence between two in phase AC signals is to be determined, it is essential that there be exact phase alignment between the two AC signals sought to be compared, and this is the purpose for the phase adjustment circuit 28 in the system.

If the system has been properly calibrated, however, it will be apparent that the corrected magnetic susceptibility voltage signal will be exactly in phase with the exciter voltage, and thus the output of the first phase sensitive detector 29 will provide a magnetic susceptibility signal on conductor 16 which is transported to the surface by way of the cable 10.

Referring again to the voltage induced in the receiver coil 21, it should be noted that the net voltage which is derived from the cancelling circuit 25 after cancellation of the voltage component corresponding to the exciter voltage in the transmitter coil 20 will nevertheless still be composed of the various components which are a function of the coupling effect provided by the formation 4. One voltage component is attributable to the magnetic permeability of the coupling formation 4 and is the primary basis for the magnetic susceptibility measurement represented by the output voltage 16 from the first phase sensitive detector 29 (since the contribution made by the permittivity of the formation 4 is relatively stable and is quite small). The other component of importance, however, is a result of the conductivity of the formation 4.

For reasons which are apparent to those skilled in this art, the voltage component of the output signal from the phase monitoring and correction circuit 25 corresponding to the magnetic susceptibility of the formation 4 is always 90° out of phase with the voltage component corresponding to the conductivity of the formation 4. Thus, when the exciter voltage input to the first phase detector 29 is exactly in phase with the magnetic susceptibility component of the input voltage signal from the amplifier and filter circuit 27, it will necessarily be 90° out of phase with the conductivity component of the voltage from the amplifier and filter circuit 27.

On the other hand, when the phase of the exciter voltage is shifted 90° by the 90° phase shifter circuit 30, it will then be in phase with the conductivity component of the voltage signal from the amplifier and filter circuit 27. Thus, the DC output voltage 15 from the second phase sensitive detector 31 will constitute a voltage signal which comprises functional representation of the conductivity of the formation 4. Furthermore, since both voltage signals on conductors 15 and 16 are derived during the same trip through the borehole 2, this will provide simultaneous and correlative measurements of both the conductivity and magnetic susceptibility of the formation 4.

As hereinbefore stated, the null coils 19 are preferably located in the housing 6 so as to be substantially independent of the effects of either the formation 4 or the electromagnetic field generated by the transmitter coil 7, whereby the voltage which is developed in the receiver null coil 23 is in phase with the exciter voltage being supplied by the AC signal source 24. The windings of the null coils 22 and 23 are usually quite close, however, and thus the phase of the null voltage is especially susceptible to the effect of temperature fluctuations in the borehole 2, and this, in turn, can introduce error factors in the output signal from the cancelling circuit 25. These changes are admittedly relatively small in magnitude under ordinary conditions. Nevertheless, it will be apparent that a slight difference in the phase angle of either the voltage in the receiver coil 21, or the voltage in the receiver null coil 23, will have a disproportionately large effect on the magnitude of the net voltage remaining after cancellation has occurred. Accordingly, provision is preferably included in the cancelling circuit 25 for detecting the occurrence of any phase shift in the voltage in either the receiver coil 21 or the receiver null coil 23, and for realigning the cancelling voltage to correct for such shift.

Referring now to FIG. 3, there may be seen a simplified schematic representation of one form of circuit which is suitable for the purposes of the cancelling circuit 25 depicted in FIG. 2, and which includes provision for correcting for phase shift as hereinbefore explained. In particular, terminal 40 may be seen to be connected to receive the voltage $e_s$, which is the voltage induced in the receiver coil 21 by the electromagnetic field, and terminal 41 may be seen to be connected to receive the cancelling voltage $e_n$ which is induced in the receiver null coil 23. Thus, the $e_s$ signal is coupled through a suitable load resistor 43 to the negative input of a difference amplifier 50 and also via an automatic gain control circuit 54 to one of the inputs of a suitable phase detector 49. In this connection, it may be noted that the difference amplifier 50 has been rendered operational by the provision of the resistors 51 and 52, and 43 and 44.

The null voltage $e_n$ is coupled through resistors 42 and 44 to the positive input of the difference amplifier 50, in order to cancel the component of the $e_s$ signal which is contributed by mutual inductance of the receiver coil 21 and the transmitter coil 20. Accordingly, the output signal $e''_s$ from the amplifier 50 will now include only the voltage components attributable to the magnetic permeability, permittivity, and the conductivity of the formation 4, as hereinbefore explained.

The $e'_n$ signal which is used to effect this cancellation is a phase-dependent voltage, and if any phase shifts occur as a result of the effect of temperature and other ambient parameters in the borehole 2, the resulting misalignment with the exciter voltage will introduce voltage errors which will adversely affect the accuracy and reliability of the output voltages 15 and 16 from the two phase sensitive detectors 29 and 31 depicted in FIG. 2. Accordingly, in the circuitry depicted in FIG. 3, means are provided to continually monitor the phase of the input signal $e_n$ with respect to the phase of the signal $e_s$, and to continually relign the signal $e_n$ so that it is always exactly in phase with the signal $e_s$.

Referring again to FIG. 3, therefore, it may be seen that the two signals $e'_s$ and $e'_n$ are preferably applied via AGC circuits 53 and 54 to the inputs of a conventional phase detector 49 which develops an output voltage which is functionally related in magnitude to any phase difference between its input signals. As is well known to those with experience in this art, a phase detector of conventional design will produce such an output only if its input voltages are unchanging in amplitude. Accordingly, the two input voltages $e'_s$ and $e'_n$ are preferably equalized in amplitude by one or both automatic gain control circuits 53 and 54, before being applied to the phase detector 49.

It may be seen that the voltage $e'_n$ is conducted through resistors 42 and 44 from terminal 41. It is well known that connecting a capacitance such as a voltage sensitive diode 47 into an AC circuit, either in parallel or in series, will produce a phase shift on signals in the circuit which is functionally related in magnitude to the voltage established across the capacitance 47. Accordingly, a phase shift circuit composed of a varactor or capacitance diode 47 and a resistor 48 is preferably coupled between ground and the junction between the resistors 42 and 44. The output voltage from the phase detector 49, suitably sealed, may then be coupled to the junction between the diode 47 and the resistor 48. Thus, an output voltage will be generated by the phase detector 49 whenever there is a phase shift between the input voltages $e'_s$ and $e'_n$ to the difference amplifier 50, and this can be used to vary the capacitance of the diode 47 proportionately to produce a corresponding change in the phase of the null voltage $e'_n$ with respect to the $e'_s$ signal.

Referring again to FIG. 3, it will be noted that the varactor diodes such as diode 47 typically have a nonlinear capacitance characteristic, whereas the output from the phase detector 49 is linear in character. Accordingly, the phase detector 49 is preferably coupled to a logarithmic amplifier 55 for reasons which will hereinafter be explained in detail, and a variable gain amplifier 56 is included to supply a variably amplified control signal which can be made to closely correspond to the capacitance-voltage characteristic of the diode 47.

Typically, the capacitance of such a diode 47 tends to decrease with the application of a reverse voltage such as would be supplied as the output of the phase detector 49 increases. Thus a large error in phase angle will tend to introduce only a very small change in the phase angle of the null voltage. This deficiency is overcome in the circuitry depicted in FIG. 3, however, by coupling a fixed negative DC bias voltage to the diode 47 in parallel with the positive variable DC control voltage. Thus, the diode 47 receives a relatively small control voltage when a large phase angle error is detected, and a large control voltage when a small error is detected, due to the algebraic summation of the bias and control signals. As may be noted in FIG. 3, this fixed DC voltage is provided by a circuit composed of a resistor 58 and a fixed negative DC voltage supply 57 of conventional design.

Figure 4:
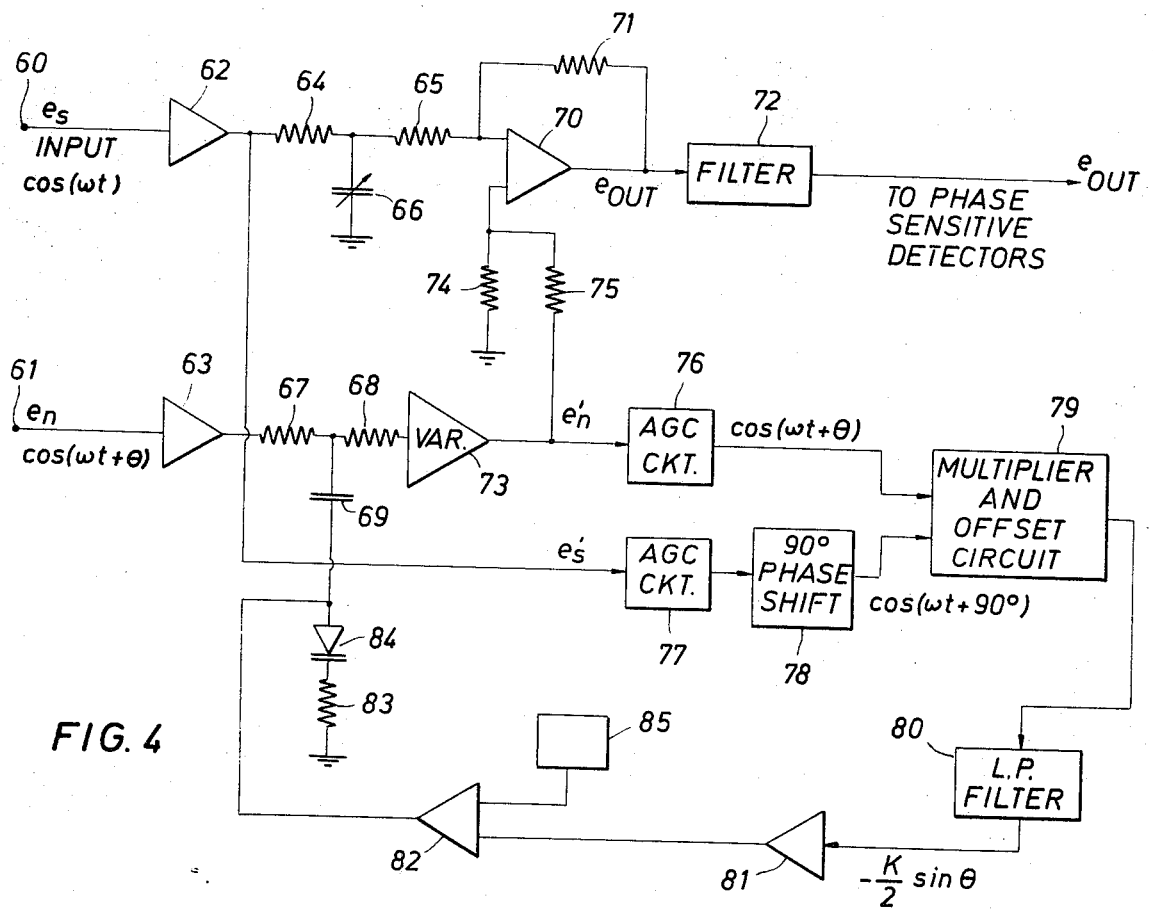
FIG. 4 is a similar representation of another form of apparatus suitable for the purposes of the apparatus depicted in FIG. 3.

Referring to FIG. 4, there may be seen a similar cancelling circuit 25 wherein the input voltage signal $e_s$ which is received from the receiver coil 21 at terminal 60 is applied by way of the preamplifier 62 and the resistors 64 and 65 to one of the inputs of a differential amplifier 70. Accordingly, the output of the differential amplifier 70, which contains the magnetic susceptibility signal sought to be measured, is preferably passed through a suitable filter 72 to eliminate any AC components which have been added by circuit components such as the preamplifier 62 and 63 and the differential amplifier 71. The null voltage signal $e_n$, which is transmitted to the other preamplifier 63 from terminal 61, is applied through resistors 67 and 68 to the input of a variable gain amplifier 73 which provides means for manually nulling any static imbalance which may occur in the $e_s$ and $e_n$ voltages. The output null signal $e'_n$ from the variable gain amplifier 73 is applied through resistor 75 to the opposite input of the differential amplifier 70 to cancel the voltage component in the $e'_s$ signal which may be attributed to the exciter voltage which actuates the receiver coil 20. Accordingly, it will be noted that the differential amplifier 70 is rendered operational by the provision of resistors 65, 71, 74 and 75, as hereinbefore mentioned with respect to the differential amplifier 50 depicted in FIG. 3.

Referring again to FIG. 4, it will be noted that the output signal $e'_s$ from the first preamplifier 62 is also connected to the input of a suitable automatic gain control circuit 77 and that the null voltage $e'_n$ from the variable gain amplifier 73 is similarly coupled to the input of another automatic gain control circuit 76 of suitable design. The output of the two AGC circuits is then coupled to appropriate inputs of a suitable phase detection circuit such as multiplier and offset circuit 79 of conventional design, to derive a DC voltage which is representative of the magnitude of any phase differential between the two inputs to the difference amplifier 70. Since the responses of a conventional multiplier circuit are 90° out of phase, however, the output from the AGC circuit 77 is preferably passed through a 90° phase shifting circuit 78 of suitable design before being applied to the multiplier and offset circuit 79.

The DC output voltage from the multiplier and offset circuit 79 is preferably passed through a suitable low-pass filter 80 to eliminate unwanted AC components which may have been introduced by the multiplier circuit 79. The filtered signal is then applied to the input of a DC amplifier 81 having its output coupled to one of the inputs of a suitable subtractor circuit 82 having its other input coupled to receive a preselected reference voltage from a suitable voltage supply 85.

As will hereinafter be explained in detail, it is the purpose of the subtractor circuit 82 to derive a correction voltage for application to the varactor diode 84. However, the proper value of the correction voltage may be stated as $k - \phi$, where $k$ is the value of a fixed voltage equal to or greater than the voltage which (theoretically) produces zero capacitance across the diode 84, and where $\phi$ represents the magnitude $-(k/2) \sin \theta$, which is the voltage being applied to the input of the DC amplifier 81. Here $\theta$ is the phase angle error which is sought to be corrected before $e_s$ and $e_n$ are combined.

The relationship will become apparent if the magnitude of the input signal $e_s$ is restated in the conventional form $\cos(\omega t)$, and the input null signal $e_n$ is similarly restated as $\cos(\omega t + \theta)$, wherein $\omega t$ is the angular frequency of the input voltages $e_s$ and $e_n$ and $t$ represents time. Thus, the input signal $e'_n$ which is applied to the multiplier and offset circuit 79 may be stated to be of the form $\cos(\omega t + \theta)$, after being corrected, and the input null signal $e'_s$ may be restated as $\cos(\omega t + 90°)$, after traversing the phase shift circuit 78. Accordingly, it will be apparent that the output voltage $e_0$ from the filter 80 may be expressed by the relationship:

$$e_0 = (k/2) \cos(\theta - 90°)$$

or:

$$e_0 = -(k/2) \sin \theta$$

Referring again to FIG. 4, it will thus be apparent that if a phase angle error difference is detected which produces, say, a −15 volts from the DC amplifier 81, and if, for example, the voltage supply 85 is set to produce a reference voltage of 17 volts, the output from the subtractor circuit 82 will be −2 volts. This small correction voltage will produce a large charge in the capacitance of the diode 84, and will thereby correct the large phase angle error which produced the large output voltage from the multiplier and offset circuit 79.

Referring again to FIG. 4, it may be seen that the diode 84 is preferably coupled between a resistor 83 and the two resistors 67 and 68, so that changes in the capacitance across the diode 84 will correct phase changes in the null voltage $e_n$. It will be apparent, however, that the diode 84 may alternatively be coupled, instead, to the output circuit from the first preamplifier 62, so that any phase corrections will be made to the input voltage $e_s$ rather than to $e_n$. It will also be seen that the circuitry preferably includes a DC isolation capacitor 69 interconnected between the diode 84 and the resistors 67 and 68, to prevent the correction voltage from reaching the variable gain amplifier 73. A variable capacitor 66 is preferably interconnected between ground and the junction between resistors 64 and 65, to provide means for correcting for any residual phase effect resulting from the diode 84 and the isolation capacitor 69.

Referring again to FIG. 4, it will be noted that when the receiver coil voltage $e_s$ is represented as $\cos(\omega t,)$ this presupposes that the phase angle error has occurred in the receiver voltage $e_n$, rather than in the receiver voltage $e_s$. If the receiver voltage $e_s$ contains the error, this will not affect or change the operation of the circuitry depicted in FIG. 4, however, and it is preferable to make all phase corrections to the null voltage $e_n$ since the receiver voltage $e_s$ contains information pertaining to formation lithological characteristics sought to be measured.

Figure 5:
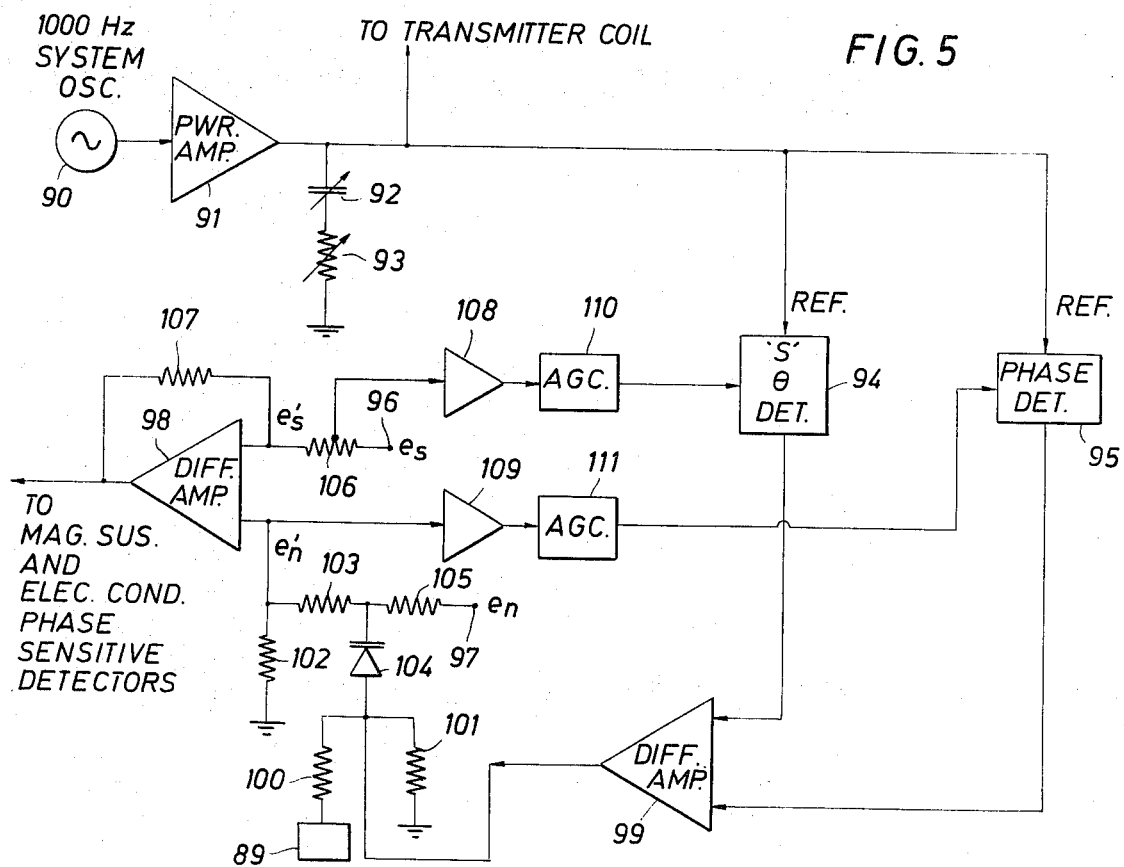
FIG. 5 is also a similar representation of a third different form of apparatus suitable for the purposes of the apparatus depicted in FIG. 3.

Referring now to FIG. 5, there may be seen another different embodiment of the cancelling circuit 25 depicted in FIG. 2, wherein terminals 96 and 97 are provided to receive voltages $e_s$ and $e_n$, respectively. A difference amplifier 98 is included to provide an output signal which is the difference between voltages $e'_s$ and $e'_n$, and which is a functional representation of the magnetic susceptibility of the formation 4. In addition, resistors 102, 103, 106 and 107 are provided to render the difference amplifier 98 operational as hereinbefore explained. It will also be seen that the voltage $e'_n$, which is applied to the difference amplifier 98, is also applied to the input of a first phase detector 94 by way of a fixed gain amplifier 108 and an AGC circuit 110. Similarly, the cancelling or null voltage $e'_n$ is applied to the input of a second phase detector 95 by way of another different fixed gain amplifier 109 and AGC circuit 111.

The reference signal employed in this instance by the phase detectors 94 and 95, however, may be seen to be the exciter voltage from the AC signal source 25 which, in FIG. 4, may be an oscillator circuit 90 and power amplifier 91. Thus, one output of the amplifier 91 is coupled to the input of the transmitter coil 20 (not depicted in FIG. 4), and the other output is coupled to the reference voltage inputs of the phase detectors 94 and 95 by way of a system phase adjustment circuit which, as depicted in FIG. 5, may be a variable capacitor 92 and variable resistor 93.

Since the two AGC circuits 110 and 111 function to stabilize the amplitudes of the two voltages $e'_s$ and $e'_n$, the two phase detectors 94 and 95 will provide output voltages which are precisely representative of any phase differences between the exciter voltage and the two voltages $e'_s$ and $e'_n$, respectively. Accordingly, the two output voltages from the phase detectors 94 and 95 may be applied to the two inputs of another difference amplifier 99 which preferably has a logarithmic gain, and which has its output coupled to alter the capacitance of a voltage sensitive diode 104 coupled between a grounded resistor 101 and the junction between resistors 103 and 105. It will thus be apparent that, in the circuitry depicted in FIG. 5, provision is made to compensate for any phase difference between the exciter voltage and either of the two received voltages $e'_s$ and $e'_n$, but that the phase correction is applied to the null voltage $e'_n$.

As hereinbefore explained, a large phase shift between the exciter voltage and either or both of the coil voltages $e'_s$ and $e'_n$ will produce a large output voltage from the respective one or both of the phase detectors 94 and 95. Since these phase shifts may be expected to result more from environmental factors in the borehole 2 rather than from system peculiarities, a phase change in the input voltage $e'_s$ will usually be matched by a corresponding phase change in the null voltage $e'_n$, and thus the phase difference between the two voltages $e'_s$ and $e'_n$ will nevertheless be relatively small. Accordingly, all phase corrections which are required to achieve effective cancellation of the mutual induction exciter voltage component from the receiver coil voltage $e_s$ may conveniently be made to either of the two coil voltages $e_s$ and $e_n$ without serious effect on the accuracy of the magnetic susceptibility measurement 16 being transmitted to the surface of the earth 3.

As hereinbefore noted, the capacitance of the semiconductor diode 104 changes non-linearly with the application of the voltage from the difference amplifier 99. This source of inaccuracy is compensated for, however, by the fact that the output from the difference amplifier 99 varies logarithmically rather than linearly, as hereinbefore stated, and thus the output voltage from the amplifier 99 can be made to correspond relatively closely with the capacitance characteristics of the diode 104.

A large phase shift between the two coil voltages $e_s$ and $e_n$ will produce a large increase in the output voltage from the difference amplifier 99, but the application of a large voltage to the diode 104 will produce a large decrease in the capacitance of the diode 104 which, in turn, produces only a relatively small change in the phase of the null voltage $e'_n$. Accordingly, a negative offset voltage of fixed preselected magnitude may be added to the correction voltage being applied to the varactor diode 104, by the addition of the DC voltage source 89 and resistor 100 depicted in FIG. 5. Thus, a large phase shift between the coil voltages $e_s$ and $e_n$ will apply a small correction voltage to the diode 104 to produce a large phase correction for the null voltage $e'_n$.

In the embodiments of the cancelling circuit 25 which are illustrated in FIGS. 3–5, the phase correction has been applied only to the null voltage, notwithstanding that the voltage across the receiver coil 21 is also subject to phase change relative to the exciter voltage which is employed as a reference to derive a measurement of the magnetic susceptibility and conductivity of the earth materials surrounding the borehole 2. This is an entirely practical expedient, however, since the voltage across the receiver coil 21 is relatively quite small because of the effect of the formation 4. Accordingly, phase variations which arise from system characteristics, and which would ordinarily be relatively small, will be large relative to the magnitude of the signal in the receiver coil 21. The receiver coil 21 and the two null coils 22 and 23 are particularly susceptible to phase variance factors, but it is usually difficult to determine which coil circuit is the most liable to produce phase change. Whenever a choice is required, however, it is usually preferable to adjust the null voltage $e_n$ as illustrated in FIGS. 3–5, since the receiver null coil 23 is known to be particularly susceptible to the effect of temperature changes in the borehole 2 for reasons hereinbefore given.

Figure 6:
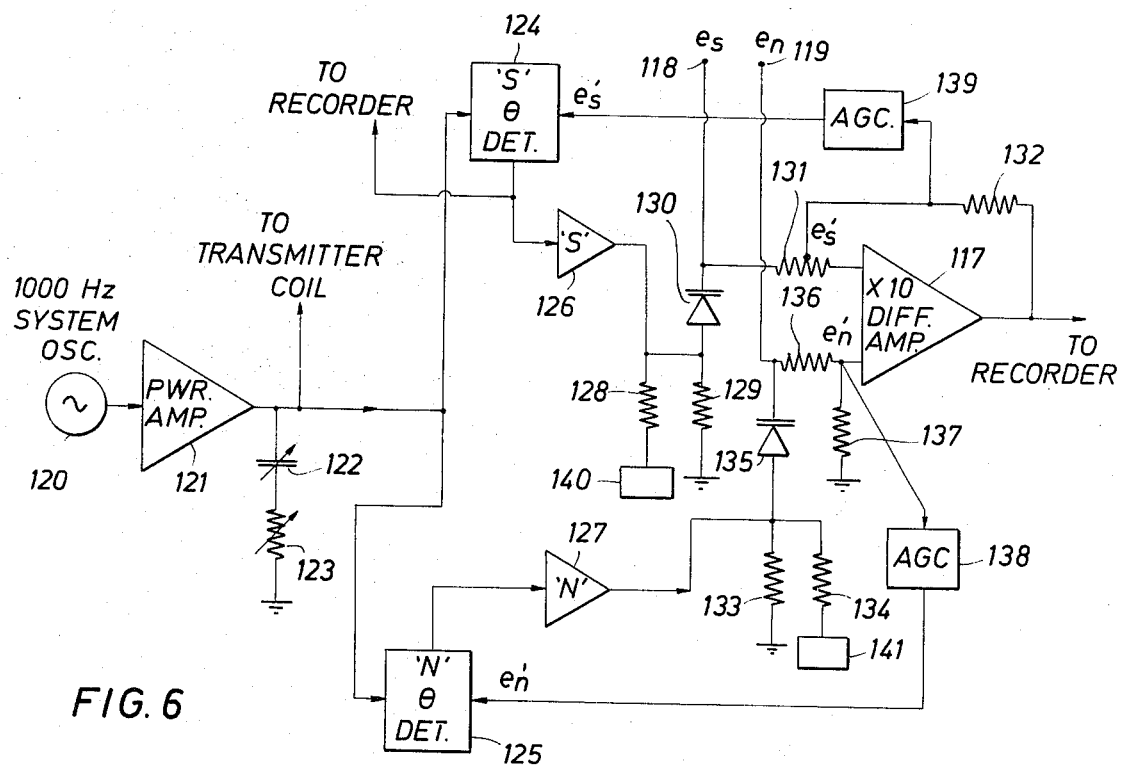
FIG. 6 is also a similar representation of a fourth different form of apparatus suitable for the purposes of the apparatus depicted in FIG. 2.

Referring now to FIG. 6, however, there may be seen another form of circuitry which may be used for correlatively measuring other lithological characteristics of the formation 4 as well as its magnetic susceptibility, and which provides a phase correction for both of the two input voltages $e_s$ and $e_n$. In particular, terminal 118 is connected to receive the coil voltage $e_s$ which is coupled through resistor 131 to be applied as a corrected voltage $e'_s$ to one input of a differential amplifier 117. Terminal 119 is coupled to receive the null coil voltage $e_n$ which is supplied through the resistor 136 to be applied as a corrected null voltage $e'_n$ applied to the other input of the difference amplifier 117. Resistors 131 and 132, and resistors 136 and 137, are connected in a conventional manner to render the difference amplifier 117 operational.

The corrected coil voltage $e'_s$ may also be seen to be coupled through a conventional AGC circuit 139 to one input of a first phase detector 124, which has its other input coupled to sample the exciter voltage generated by the oscillator 120 and power amplifier 121. As hereinbefore explained, a phase adjustment circuit composed of a variable resistor 123 and a variable capacitance 122 is preferably coupled to the output of the power amplifier 121 to provide for elimination of phase angle changes caused by system parameters.

The corrected null voltage $e'_n$ is similarly coupled through a conventional AGC circuit 138 to one input of a second phase detector 125 having its other input coupled to sample the exciter voltage. Accordingly, the first phase detector 124 will produce an output voltage corresponding to the magnitude of any phase difference occurring between the corrected receiver coil voltage $e_s$ and the exciter voltage, and the second phase detector 125 will similarly produce a voltage corresponding to any phase difference between the exciter voltage and the corrected null voltage $e'_n$, regardless of how such phase differences may have occurred.

Referring again to FIG. 6, it may be seen that a first voltage sensitive diode 130 and resistor 129 is coupled between ground and the terminal 118 in the manner hereinbefore described with respect to the circuits depicted in FIGS. 3–5. Thus, the output voltage from the first phase detector 124 may be applied to a logarithmic amplifier 126, and a fixed DC power source 140 and resistor 128 may be coupled in parallel with the output of the amplifier 126, to appropriately adjust the capacitance of the varactor diode 130. Thus, the signal $e'_s$ is realigned in phase with the adjusted exciter voltage before being transmitted to the difference amplifier 117.

Similarly, a second separate voltage sensitive diode 135 and resistor 133 is coupled between ground and the terminal 119. Thus, the output voltage from the second phase detector 125 may be applied in a similar manner to the input of a second logarithmic amplifier 127 having its output coupled in parallel with a fixed DC power source 141 and resistor 134 to the diode 135, to correct any phase differences occurring between the corrected null voltage $e'_n$ and the exciter voltage. It will be apparent that in the circuitry depicted in FIG. 6, an improved magnetic susceptibility measurement can be obtained since both signals $e'_s$ and $e'_n$ are constantly being monitored and corrected for any and all phase shifts relative to the exciter voltage, and that such correction is performed before the exciter voltage component is cancelled from the receiver coil voltage $e'_s$.

In the embodiment of FIG. 6, since the receiver voltage $e'_s$ being applied to the difference amplifier 117 has already been realigned in phase with the exciter voltage from the power amplifier 121, it will be apparent that the output signal from the difference amplifier 117 is itself representative of the magnetic susceptibility. After amplification and other suitable processing, this signal may be forwarded to the recorder 14 depicted in FIG. 1. The output of the phase detector 124 contains the information essential to reconstruct the conductivity signal. Thus, this signal may also be processed and recorded as a correlative indication of lithological characteristics other than magnetic susceptibiity, as will be apparent to those with experience in this art.

Other modifications and alternatives will be apparent which will be within the scope of the present invention. Accordingly, it should be clearly understood that the methods and structures hereinbefore described and illustrated in the accompanying drawings are exemplary only and are not intended as limitations on the scope of the invention.

What is claimed is:

1. In a logging system for determining the magnetic susceptibility of a subsurface earth formation traversed by a borehole, the combination comprising transmitter means for inducing a time varying electromagnetic field in earth formations in the vicinity of the borehole, means for supplying a time varying voltage to said transmitter means, means for receiving a time varying electromagnetic field having quadrature phase related voltage components at least one of which is attributable to the magnetic susceptibility of said formation, means for deriving a null voltage opposite in phase and at least substantially equal in magnitude to the component of said receiver voltage attributable to any mutual inductance effects between said transmitter means and said receiver means, means for deriving a phase correction signal functionally related to any phase difference occurring between said null voltage and said mutual inductance related voltage, means responsive to said phase correction signal for combining said null and mutual inductance related voltages to cancel the mutual inductance related voltage component of said receiver voltage, thereby leaving remaining voltage components attributable to the electromagnetic field induced in said earth formation, and means responsive to said remaining voltage components for measuring the component thereof attributable to the magnetic susceptibility of the earth formations.

2. The system described in claim 1, wherein the means for deriving said phase correction signal includes:

monitoring means responsive to one of said null and receiver voltages for determining the occurrence and magnitude of any phase difference with respect to the other of said null and receiver voltages, and phase alignment means responsive to said monitoring means for realigning said one voltage with said other voltage.

3. The system described in claim 2, wherein said monitoring means includes phase detection means for deriving a phase difference voltage functionally related in magnitude to any phase difference between said receiver voltage and said null voltage; and correction means responsive to said phase difference voltage for regulating said phase alignment means.

4. The system described in claim 3, wherein said phase alignment means includes variable capacitance means functionally connected to the output of at least one of said null voltage derivation means of said receiver means for shifting the phase of at least one of said null and receiver voltages in response to said correction means.

5. The system described in claim 4, wherein said correction means further includes:

means for deriving a time varying DC correction voltage having a magnitude functionally related to said phase difference between said null and receiver voltages, and means for supplying said correction voltage to a voltage sensitive diode comprising said variable capacitance means in such a manner as to cause the capacitance of said diode to change in a direction and amount sufficient to cause the appropriate phase shift in either said null or said receiver voltage as desired.

6. In a logging system for determining the magnetic susceptibility of a subsurface earth formation traversed by a borehole, the combination comprising:

a transmitting inductance for generating an electromagnetic field in said formation in response to a time varying exciter voltage, a receiver inductance for deriving from said field a receiver voltage having components attributable to said exciter voltage through mutual inductance effects and to the magnetic susceptibility of said formation, a null inductance for deriving a null voltage opposite in phase and substantially equal in magnitude to said exciter voltage component of said receiver voltage, phase correction means interconnected with said null inductance for detecting the occurrence of any phase difference between said null and receiver voltages and for realigning said null voltage with said receiver voltage, and cancelling means interconnected with said phase correction means for combining said realigned null voltage with said receiver voltage for cancelling said exciter voltage component of said receiver voltage.

7. The system described in claim 6, wherein said phase correction means includes monitoring means interconnected between said cancelling means and said null and receiving inductances for determining the occurrence and magnitude of any phase differences between said null and receiver voltages, and phase alignment means interconnected between said cancelling means and said null inductance for realigning said null voltage with said receiver voltage in response to said monitoring means.

8. The system described in claim 7, wherein said phase alignment means further includes means for providing a variable DC voltage having a magnitude functionally related to the magnitude of said phase difference determined by said monitoring means, and variable capacitance means responsive to said DC voltage for shifting the phase of said null voltage into phase coincidence with said receiver voltage.

9. The system described in claim 8, wherein said variable capacitance further includes a fixed voltage means interconnected in parallel with said variable voltage means and providing a fixed DC voltage of a predetermined magnitude, and a voltage sensitive diode interconnected with said null inductance and said variable and fixed voltage means and having a non-linear capacitance characteristic generally logarithmically related to the magnitude of the sum of said fixed and variable DC voltages.

10. The system described in claim 9, wherein said variable voltage means is adapted to provide said variable DC voltage with a non-linear logarithmic characteristic substantially corresponding to the capacitance characteristic of said diode.

11. In a logging system for determining the magnetic susceptibility of a subsurface earth formation traversed by a borehole, the combination comprising transmitter coil means for generating an electromagnetic field in the earth formations in the vicinity of the borehole in response to a time varying excitation voltage impressed thereon, receiver coil means for deriving from said field a receiver voltage having components attributable to said excitation voltage and to the magnetic susceptibility of said formation, null coil means for deriving a null voltage opposite in phase and at least substantially equal in magnitude to said excitation voltage component of said receiver voltage, phase correction means interconnected with said null and receiver coils for detecting the occurrence of any phase differences between said excitation voltage and said null and receiver voltages and for realigning said null and receiver voltages with said excitation voltage, and cancelling means interconnected with said correction means for combining said realigned voltages for cancelling the excitation voltage component of said receiver voltage.

12. The system described in claim 11, wherein said phase correction means includes first monitoring means interconnected between said cancelling means and said null coil for determining the occurrence and magnitude of any phase difference between said null and excitation voltages, second monitoring means interconnected between said cancelling means and said receiver coil for determining the occurrence and magnitude of any phase difference between said receiver and excitation voltages, first alignment means responsive to said first monitoring means and interconnected between said cancelling means and said null coil for realigning said null voltage to be in phase with said excitation voltage, and second alignment means responsive to said second monitoring means and interconnected between said cancelling means and said receiver coil for realigning said receiver voltage to be in phase with said excitation voltage.

13. The system described in claim 12, wherein said first and second alignment means include variable voltage means for providing a variable DC voltage having a magnitude functionally related to the magnitude of the phase difference determined by said monitoring means, and variable capacitance means responsive to said DC voltage for shifting the phase of either said null voltage or said receiver voltage into phase coincidence with said excitation voltage.

14. The system described in claim 13, wherein each of said variable capacitances further includes fixed voltage means interconnected in parallel with said variable voltage means and providing a fixed DC voltage of a predetermined magnitude, and a voltage sensitive diode interconnected with said null inductance and said variable and fixed voltage means and having a non-linear capacitance characteristic generally logarithmically related to the magnitude of the sum of said fixed and variable DC voltages.

15. The system described in claim 14, wherein each of said variable voltage means is further adapted to provide said variable voltage with a non-linear logarithmic characteristic substantially corresponding to the capacitance characteristic of the related one of said diode.

16. In a logging system for determining the magnetic susceptibility of a subsurface earth formation traversed by a borehole, the combination comprising transmitting means for generating the varying electromagnetic field in said formation in response to an excitation voltage at a frequency in the range of 1 kilohertz, receiver means for deriving from said electromagnetic field a receiver voltage having components attributable to said excitation voltage and to the magnetic susceptibility of said formation, means for deriving a null voltage opposite in phase and substantially equal in magnitude to said excitation voltage component of said receiver voltage, phase correction means interconnected with said null voltage derivation means for detecting the occurrence of any phase difference between said null and receiver voltages and for changing the phase of said null voltage with respect to said receiver voltage to achieve phase alignment of said voltages, cancelling means for combining the aligned null voltage with said receiver voltage to derive a resulting voltage functionally related to the conductivity and magnetic permeability of said formation, and phase sensitive detector means for deriving from said resulting voltage and said excitation voltage a recordable indication of the magnetic susceptibility and the conductivity of said formation.

17. The system described in claim 6, wherein said phase correction means includes
gain control means interconnected with said null and receiving inductances for receiving and stabilizing the amplitudes of said null and receiver voltages,
phase detector means for deriving a phase difference voltage functionally related to the magnitude of any difference in phase between said null and receiver voltages,
a variable voltage source for deriving a non-linear DC voltage having a logarithmic gain characteristic and functionally related in magnitude to said phase difference voltage,
a fixed voltage source for providing a fixed DC voltage of a predetermined magnitude,
a voltage sensitive diode interconnected with said null inductance and said variable and fixed voltage sources and having a non-linear capacitance characteristic at least generally corresponding to the gain characteristic of said variable voltage source and to the sum of said fixed and variable DC voltages.

18. The system described in claim 16, wherein said phase correction means includes
gain control means interconnected with said null and receiving inductances for receiving and stabilizing the amplitudes of said null and receiver voltages,
first phase detector means for deriving a first phase difference voltage functionally related in magnitude to any difference in phase between said receiver voltage and said excitation voltage,
second phase detector means for deriving a second phase difference voltage functionally related in magnitude to any difference in phase between said null voltage and said excitation voltage,
control means for deriving a DC control voltage functionally related to said first and second phase difference voltages, and
semiconductance means interconnected with said null inductance and said cancelling means for shifting the phase of said null voltage in response to said DC control voltage.

19. In a logging system for determining the magnetic susceptibility of a subsurface earth formation traversed by a borehole, the combination comprising
an AC source for providing an exciter voltage,
a transmitting inductance for generating an electromagnetic field in said formation in response to said exciter voltage,
a receiver inductance for deriving from said field a receiver voltage having components attributable to said exciter voltage and to the magnetic susceptibility of said formation,
a null inductance for deriving a null voltage opposite in phase and at least substantially equal in magnitude to said exciter voltage component of said receiver voltage,
first phase correction means interconnected with said null inductance for detecting the occurrence of any phase difference between said null and exciter voltages and for realigning said null voltage with said exciter voltage,
second phase correction means interconnected with said null inductance for detecting the occurrence of any phase difference between said receiver and exciter voltages and for realigning said receiver voltage with said exciter voltage, and
cancelling means interconnected with said phase correction means for combining said realigned null and receiver voltages and for deriving a resultant functional indication of the magnetic susceptibility of said formation.

20. The system described in claim 19, wherein said phase correction and canceling means include
first phase detection means for deriving a first phase difference voltage functionally related to the magnitude of any phase difference between said null voltage and said exciter voltage,
first control means for deriving a first DC control voltage functionally related to said first phase difference voltage,
first semiconductance means interconnected with said null inductance for aligning the phase of said null voltage with said exciter voltage in response to said first DC control voltage,
second phase detection means for deriving a second phase difference voltage functionally related to the magnitude of any phase difference between said receiver voltage and said exciter voltage,
second control means for deriving a second DC control voltage functionally related to said second phase difference voltage,
second semiconductance means interconnected with said receiver inductance for aligning the phase of said receiver voltage with said exciter voltage, and
difference means for combining said realigned voltages and canceling the exciter voltage component from said receiver voltage.

21. A method for determining the magnetic susceptibility of a subsurface earth formation traversed by a borehole, comprising
generating an AC exciter voltage,
generating an electromagnetic field in said formation in response to said exciter voltage,
deriving from said field a receiver voltage having components attributable to said exciter voltage and to the magnetic susceptibility of said formation,
deriving a null voltage opposite in phase and at least substantially equal in magnitude to said component of said receiver voltage attributable to said exciter voltage,
monitoring and correcting any phase differences occurring between said null voltage and said receiver voltage, and combining said null and receiver voltages to cancel said exciter voltage component of said receiver voltage.

22. The method described in claim 21, wherein said monitoring and correcting step includes
  detecting the occurrence of any phase difference between said null and receiver voltages, and
  realigning said null voltage with said receiver voltage.

23. The method described in claim 21, wherein said monitoring and correcting step includes
  detecting the occurrence of any phase differences between said exciter voltage and said null and receiver, and
  realigning said null and receiver voltages with said exciter voltage.

24. The method described in claim 21, wherein said monitoring and correcting step includes
  detecting the occurrence of any phase difference between said null and exciter voltages,
  detecting the occurrence of any phase difference between said receiver and exciter voltages,
  realigning said null voltage with said exciter voltage, and
  realigning said receiver voltage with said exciter voltage.

25. A method for determining the magnetic susceptibility of a subsurface earth formation traversed by a borehole, comprising
  generating an AC exciter voltage,
  generating an electromagnetic field in said formation in response to said exciter voltage,
  deriving from said field a receiver voltage having components attributable to said exciter voltage and to the magnetic susceptibility of said formation,
  deriving a null voltage opposite in phase and at least substantially equal in magnitude to said exciter voltage component of said receiver voltage,
  detecting the occurrence of any phase difference between said null and receiver voltages and realigning said null voltage with said receiver voltage,
  combining said realigned null voltage with said receiver voltage for deriving a resulting voltage functionally related to the conductivity and magnetic permeability of said formation, and
  deriving from said resulting voltage and said exciter voltage a recordable indication of the magnetic susceptibility of said formation.

* * * * *

UNITED STATES PATENT OFFICE
CERTIFICATE OF CORRECTION

Patent No. 3,758,847　　　　　　　　　Dated September 11, 1973

Inventor(s) Donald J. Dowling

It is certified that error appears in the above-identified patent and that said Letters Patent are hereby corrected as shown below:

Column 4, line 38, delete "21." and substitute therefor --of--.

Column 6, line 30, delete "functionall" and insert therefor --functionally--.

Column 6, line 31, delete "formatio" and insert therefor --formation--.

Column 6, line 39, delete "functionally" and insert therefor --susceptibility--.

Column 6, line 41, delete "formation" and insert therefor --processing--.

Column 6, line 48, delete "month" and insert therefor --mouth--.

Column 8, line 20, delete "diffPrence" and insert therefor --difference--.

Column 12, line 18, delete "charge" and insert therefor -- change --.

UNITED STATES PATENT OFFICE
CERTIFICATE OF CORRECTION

Patent No. 3,758,847    Dated September 11, 1973

Inventor(s) Donald J. Dowling

It is certified that error appears in the above-identified patent and that said Letters Patent are hereby corrected as shown below:

Column 19, line 18, delete "Claim 6" and insert therefor -- Claim 16 --.

Column 21, line 13, after "receiver" insert -- voltages --.

Signed and sealed this 26th day of February 1974.

(SEAL)
Attest:

EDWARD M. FLETCHER, JR.
Attesting Officer

C. MARSHALL DANN
Commissioner of Patents